Figure 1:
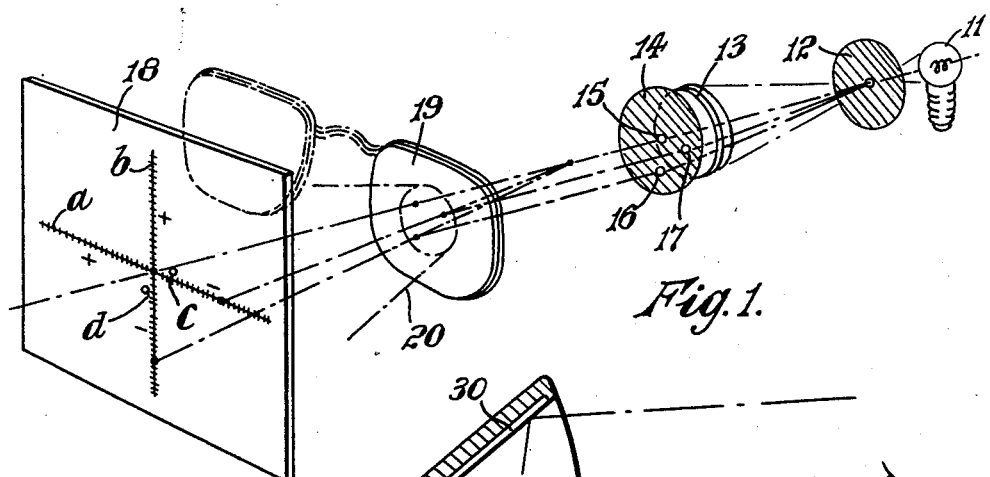

June 2, 1953 H. FREEMAN 2,640,392
APPARATUS FOR MEASURING THE FOCAL LENGTH OF LENSES
Filed Jan. 27, 1949 3 Sheets-Sheet 1

INVENTOR
HYMAN FREEMAN

June 2, 1953 H. FREEMAN 2,640,392
APPARATUS FOR MEASURING THE FOCAL LENGTH OF LENSES
Filed Jan. 27, 1949 3 Sheets-Sheet 2

INVENTOR
HYMAN FREEMAN

June 2, 1953 H. FREEMAN 2,640,392
APPARATUS FOR MEASURING THE FOCAL LENGTH OF LENSES
Filed Jan. 27, 1949 3 Sheets-Sheet 3
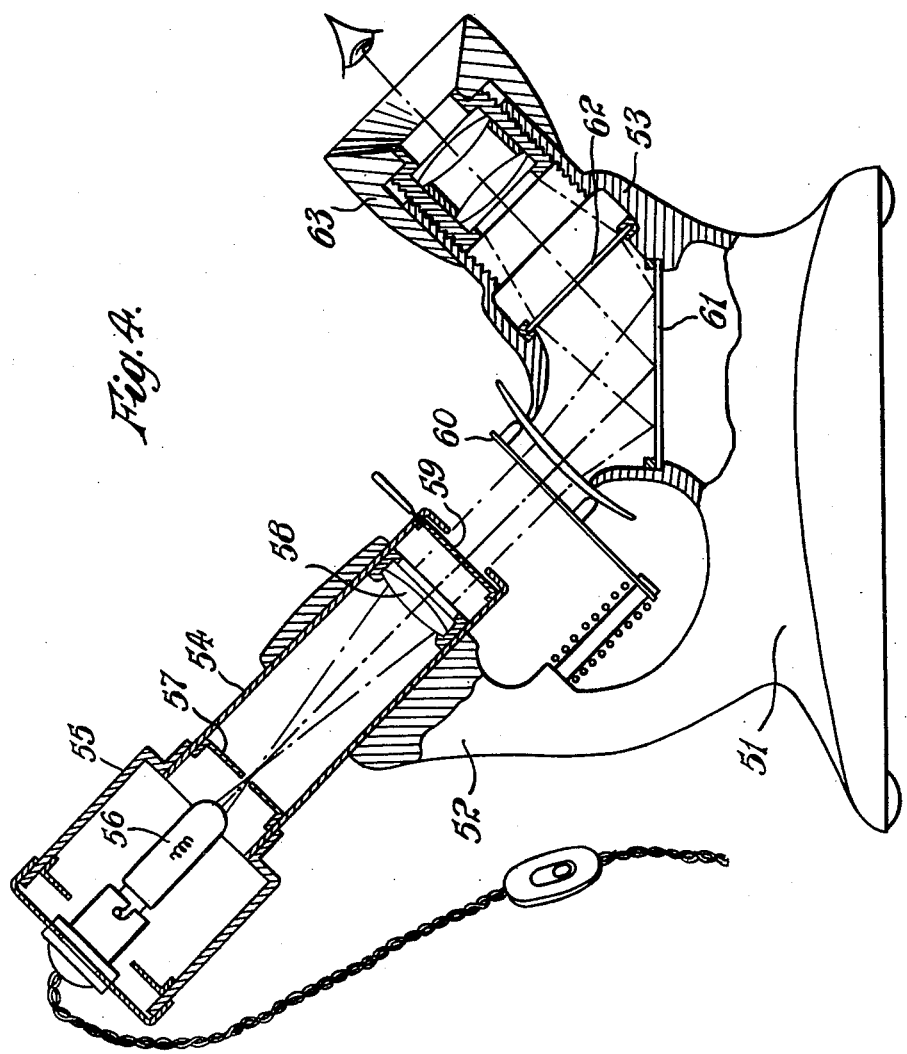
INVENTOR:
HYMAN FREEMAN Patented June 2, 1953

2,640,392

UNITED STATES PATENT OFFICE 2,640,392

APPARATUS FOR MEASURING THE FOCAL LENGTH OF LENSES

Hyman Freeman, London, England

Application January 27, 1949, Serial No. 73,121
In Great Britain February 3, 1948

3 Claims. (Cl. 88—56)

This invention relates to apparatus for measuring the focal length of lenses, especially ophthalmic lenses, and provides a simple, easily manipulable and accurate apparatus for this purpose.

Known apparatus for measuring the focal length of lenses comprise an optical system, which at zero produces a single focused image of an illuminated target on a screen, the focus of which image is disturbed by the interposition of the lens under test in the path of the beam of light impinging on the screen. The amount of adjustment of the position of the illuminated target to regain unity or sharpness of the image on the screen is the measure of the power of the lenses under test.

The present invention provides an apparatus which gives a direct reading of the power of the lenses, once the lens has been centered, without requiring any further adjustment.

A further object of the invention is to provide an apparatus with which the centering of the lens under test can be accurately effected with a minimum of difficulty and manipulation.

Briefly described, the apparatus of the present invention broadly comprises a source of light, a translucent screen, a collimating lens placed between said source of light and said screen, an opaque diaphragm placed between the collimating lens and the screen and formed with three small apertures and a support for a lens to be tested placed between the opaque diaphragm and the screen.

The diaphragm apertures, which may be closed by a mask all at one time or separately one at a time, are arranged, two to be equidistant from, and preferably disposed to form a right angle with respect to, the third, and thus transmitting three parallel pencils of light to the opaque screen.

The screen is provided with intersecting lines or co-ordinates at right angles to each other so arranged that the point of intersection of the lines coincides with the central pencil and corresponds to the optical centre of the lens under test. The intersecting lines are each provided with a scale, the zero portion of which corresponds to the position which one of the pencils of light equidistant from that representing the optical centre occupies on the scale when no lens is interposed. Each scale, commencing from zero, is calibrated in diopters, positive in one direction and negative in the opposite direction.

In order to facilitate inspection of the screen, a mirror may be provided and disposed at such an angle with relation to the screen as to reflect the image of the screen on to the eye of the operator, or alternatively, a known form of eyepiece may be used.

Figure 2:
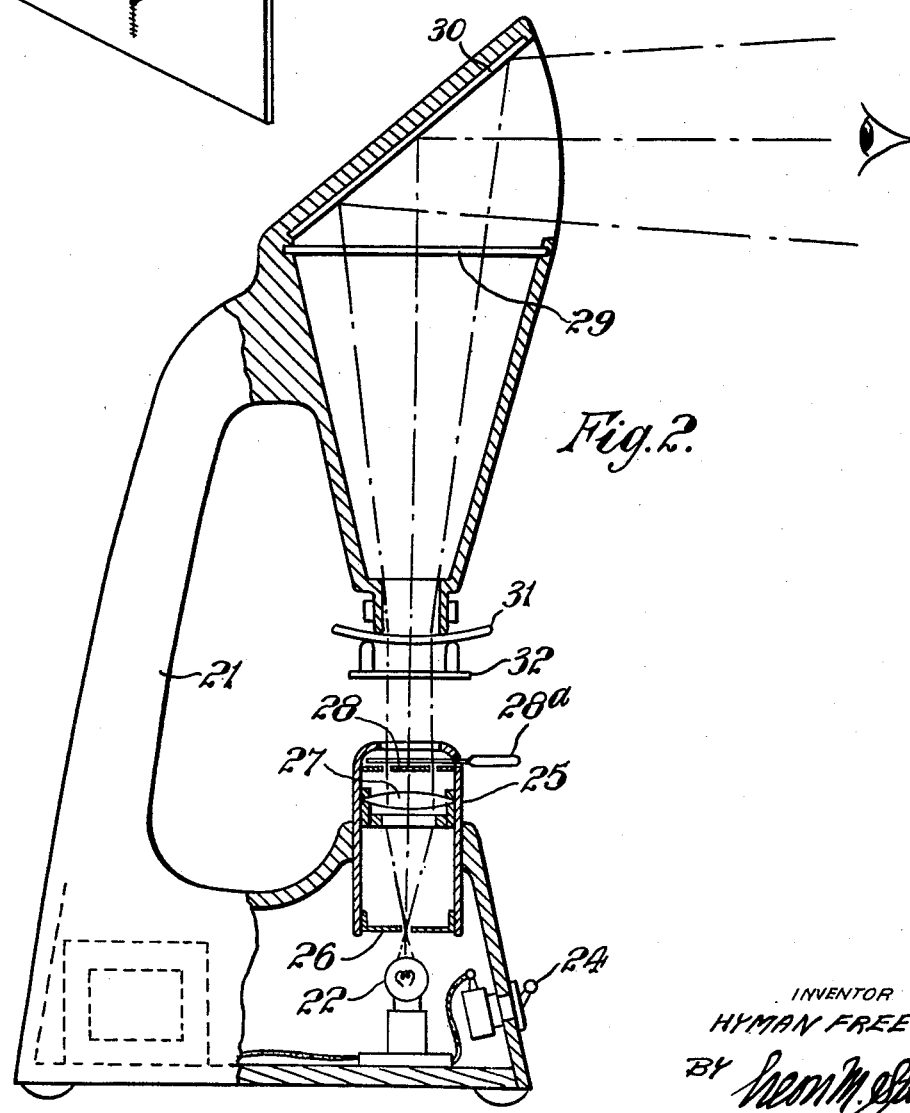
Figure 3:
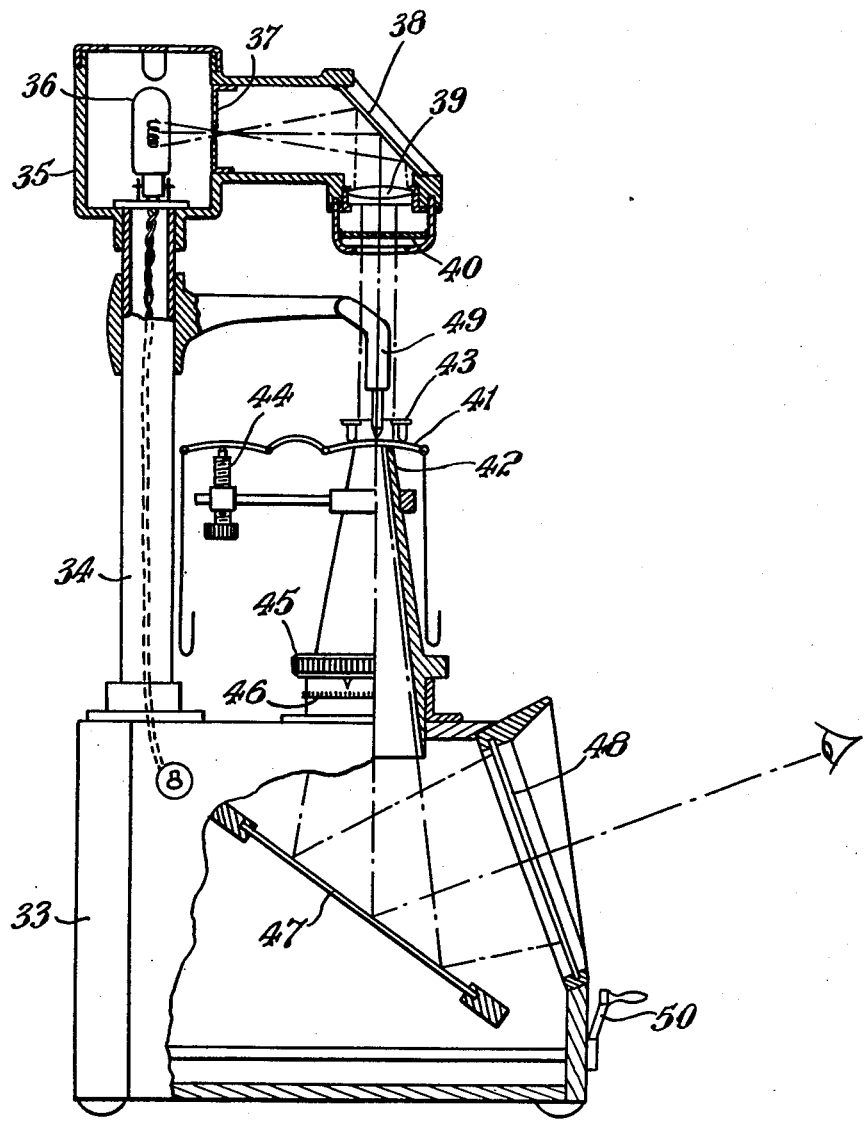

The invention is illustrated, by way of example, in the accompanying drawings, of which Figure 1 is a somewhat diagrammatic representation of the optical system of the apparatus;

Figures 2, 3 and 4 are side views, partly in section, of three embodiments of the apparatus, Figure 2 showing an upward vertical projection from the light source, Figure 3 a downward vertical projection and Figure 4 an oblique eye-piece projection of the light source.

It should be clearly understood that by a simple re-arrangement of the parts and, if desired, the introduction of reflective mirrors, the arrangement of Figures 2 and 3 can be modified by disposing the light source at the top or bottom of the device so that the image on the translucent screen, from which the measurement is determined, may be viewed from the bottom or the top respectively.

Referring to Figure 1, it will be seen that light from the source, lamp 11, passes through the pin-hole disc 12, whence the beam is paralleled by the collimating lens 13, the parallel beam then striking the opaque diaphragm 14 formed with three pin-hole apertures 15, 16 and 17, the aperture 15 lying on the optical axis of the system and the apertures 16 and 17 being equally spaced therefrom and forming therewith a right angle. These pin-hole apertures may be masked together or separately as desired by a sliding mask (not shown in this figure). With the apertures open, three parallel pencils of light forming the sides of a light prism fall on the translucent screen 18, which is marked with co-ordinate scales $a$ and $b$, the intersection of the scales lying on the optical axis and coinciding with the light pencil issuing from the aperture 15. The light pencils from apertures 16 and 17 strike the co-ordinate scales at $c$ and $d$ respectively, which become the zero points on the scales.

A lens to be tested, shown as the one lens 19 of a pair of spectacles, is mounted on a lens rest, indicated in dot-and-dash lines at 20, between the diaphragm and the screen. To measure the focal power of this lens it is first essential to ensure that its optical axis corresponds with the optical axis of the system, which may be effected by moving the lens until the light pencil from aperture 15, passing through the lens 19, strikes the intersection of the scales $a$ and $b$. It will then be found that the light pencils from the apertures 16 and 17 are displaced In the case of spherical lenses the two light pencils parallel to the central pencil will be displaced equally to points along the two scales and will give an immediate reading of the optical power of the lens under test.

In the case of a sphero-cylindrical or cylindrical lens placed on the lens rest with its principal axes not coinciding with the co-ordinate scales, the light spots projected by the displaced light pencils will be also displaced off these scales. However, by turning the lens, or the instrument, in relation to the lens, the axes can be made to coincide and the light spots then fall on the graduated lines and give the readings of the lens power along its two principal meridians.

The two readings may be found to differ and the difference will be a measure of the astigmatic element of the lens.

Instead of employing the three-apertured diaphragm for centering a lens, there may be used a disc formed with cross-slits, the image of which is thrown on to the screen and brought into coincidence with the co-ordinate scales by rotation of the lens under test. This disc may further, if desired, be formed with notches along the slits, corresponding with the apertures 16 and 17, to establish zero points on the scales.

The apparatus of Figure 2 comprises a main support 21 generally of G-form in side elevation and supporting at its lower end a source of light such as the lamp 22 operated from a transformer 23 through a switch 24. The support carries a tube 25 within which is disposed adjustably a pin-hole disc 26, a collimating lens 27 and a three-aperture diaphragm 28 having a sliding mask 28a. In the upper part of the device is mounted a ground glass screen 29 and above this screen a reflecting mirror 30 to permit the screen to be viewed from the front of the device. The lens to be tested is indicated at 31 and is carried by a rotatable but otherwise fixed support 32.

The apparatus of Figure 3 comprises a main base 33 supporting a column 34, on the upper end of which is mounted a lamp housing 35 for the lamp 36. This housing also supports the pin-hole disc 37 and the light from the source is reflected by the inclined mirror 38 to be projected downwardly through the collimating lens 39 beneath which is supported the three-aperture diaphragm 40. The light is projected downwardly through the lens 41 of a pair of spectacles to be tested, which is supported on the top of a rotatable hollow conical rest 42, being held thereon by the device 43 and adjusted to position by the screw 44. The conical rest is rotated by means of the knurled disc 45, its position being indicated by a pointer moving over the scale 46.

The light pencils pass through the conical rest, strike the reflecting mirror 47 which projects the pencils on to the inclined ground glass screen 48 mounted in the front of the device where the image can be viewed directly. A marking device, indicated at 49, may be employed to mark the lenses as they are place in position for testing, and may be operated by the handle 50.

The apparatus of Figure 4 comprises the base 51 formed with two sloping branches or horns 52 and 53, the branch 52 supporting a tube 54 to the upper end of which is attached the lamp casing 55 carrying a lamp 56. The tube 54 also supports the pin-hole disc 57, the collimating lens 58 and the three-aperture diaphragm 59. The lens itself is supported on the branch 53 by the rotatable holding device 60 and the light pencils strike the horizontal mirror 61 to be reflected to the ground glass screen 62 which is viewed through the eye-piece 63 of normal type, screwed to the end of the branch 53.

In order quite clearly to understand the invention, it is as well to describe its function with reference, for example, to Figure 3 of the drawings, the functioning being similar, of course, for Figures 1, 2 and 4.

With no lens being tested and all the apertures in the diaphragm 40 exposed, the observer will see on the screen 48 three spots of light. The central spot will lie exactly on the intersections of the co-ordinate scales. The other two will fall on the scales and will be exactly the same distance from the centre as are the eccentric apertures from the central aperture.

Interposing a lens, as at 41, will affect the three pencils differently. Consider the central pencil first. If the optical centre of the lens 41 is arranged to lie on the optical axis of the apparatus, the central light pencil will not be deflected but will proceed through the instrument as before and fall on the intersection of the scales on the screen 48. Should the lens be decentred then the central light pencil will be deflected to fall off this central position. Before any lens can be measured for power it must be accurately centered and this is simply effected by slightly moving it until the central beam and the light spot it produces on the screen fall on the intersection. Once this is done, the lens can then be observed for power. The two eccentric light pencils will be seen to have been deflected from their original positions. The amount of deflection depends on the power of the lens since all other factors are constant in the instrument. If the lens under test is a spherical lens, the two light spots on the screen will have been shifted an equal amount along the two co-ordinates of the scales $a$ and $b$ on the screen, and as the co-ordinates are graduated in diopters, the power of the lens can be read off directly, no focussing or other adjustments being necessary.

In the case of a sphero-cylindrical lens which has been centered as described, it is possible that the two principal axes of the lens will not, in the first place, coincide with the two scales. In this case, the light spots on the screen will not only be displaced away from their original positions, as were those of a spherical lens, but they will also be displaced off the scales on the screen. A rotation of the lens about its optical centre is effected by moving the conical lens rest 42, which will rotate the lens with it, and the degree of rotation can be read off on the scale 46. When the lens is in alignment with the principal meridians the light spots will fall on the graduated scales of the screen and the adjustment required to produce this coincidence provides as accurate method of determining the "axis" of an astigmatic lens.

Once these light spots have been adjusted to fall on the scales it will be found that they have been deflected from zero. The two readings will differ and the difference between them will be a measure of the astigmatic element of any lens.

The hereindescribed apparatus can be made considerably smaller by increasing the intensity of the source of light, by bringing the apertured diaphragm closer to the screen and by employing an eye-piece instead of a mirror.

Moreover, the apparatus can be arranged along a horizontal axis, in which case means can be provided for holding the lens under test in place when the same has been centered.

I claim:

1. Apparatus for measuring the focal length of lenses, comprising a support, a source of light carried by said support, a pin-hole disc in front of said source, a collimating lens to produce a parallel beam from the light issuing from the pin-hole disc, a three-aperture opaque diaphragm to project three parallel pencils of light on to a translucent screen, ordinate and abscissa scales on said screen, one pencil of light coinciding with the intersection of the co-ordinate scales, the second pencil striking the ordinate and the third pencil the abscissa scale, and a lens support for the lens to be tested arranged at a fixed distance from said screen and between the screen and the three-aperture diaphragm.

2. An apparatus for measuring the focal length of a lens, comprising a source of light, collimating means converting light from said source into a parallel beam, an opaque diaphragm in the path of said beam, said diaphragm being provided with a first, a second and a third opening defining the corners of a right-angled triangle of which said first opening is the apex and centrally located with respect to said diaphragm and collimating means, said diaphragm intercepting all of said beam except for a first, a second and a third pencil of light passing through said first, said second and said third opening, respectively, a screen in the path of said pencils of light, said screen bearing an abscissa and an ordinate intersecting at right angles, and a lens support in the path of said pencils of light between said diaphragm and said screen and spaced a predetermined distance from the latter, the position of said screen with respect to said diaphragm being such that, prior to insertion of a lens into said holder, said first pencil of light from said first opening impinges upon the point of intersection of said abscissa and said ordinate while said second and third pencils impinge upon said abscissa and said ordinate, respectively.

3. An apparatus according to claim 2, wherein said second and said third openings are equidistant from said first opening.

HYMAN FREEMAN.

References Cited in the file of this patent

UNITED STATES PATENTS

| Number | Name | Date |
|---|---|---|
| 327,602 | Scharpf | Oct. 6, 1885 |
| 1,083,309 | Troppman | Jan. 6, 1914 |
| 1,164,795 | Emerson | Dec. 21, 1915 |
| 1,241,612 | Emerson | Oct. 2, 1917 |
| 1,608,725 | Currier et al. | Nov. 30, 1926 |
| 1,706,096 | Arbuckle et al. | Mar. 19, 1929 |
| 1,894,910 | Morgan et al. | Jan. 17, 1933 |
| 2,042,565 | Lillyer | June 2, 1936 |
| 2,111,580 | Arbuckle | Mar. 22, 1938 |

FOREIGN PATENTS

| Number | Country | Date |
|---|---|---|
| 591,991 | Great Britain | Sept. 4, 1947 |